United States Patent
Schulz et al.

(10) Patent No.: US 6,235,319 B1
(45) Date of Patent: May 22, 2001

(54) CHEWING GUM SBR

(75) Inventors: Gerald Owen Schulz, Stow; Valerie Anne Hill, Akron, both of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/470,336

(22) Filed: Dec. 22, 1999

(51) Int. Cl.$^7$ ....................................... A23G 3/30

(52) U.S. Cl. ...................................... 426/3; 426/6

(58) Field of Search ............................. 426/3, 6

(56) References Cited

U.S. PATENT DOCUMENTS

| | | | | |
|---|---|---|---|---|
| 4,489,099 | * | 12/1984 | Shaheen et al. | 426/3 |
| 5,132,121 | * | 7/1992 | Orfan et al. | 426/3 |
| 5,200,213 | | 4/1993 | Orfan et al. | 426/3 |
| 5,270,060 | * | 12/1993 | Foster et al. | 426/3 |

\* cited by examiner

*Primary Examiner*—Arthur L. Corbin
(74) *Attorney, Agent, or Firm*—Alvin T Rockhill

(57) ABSTRACT

Conventional SBR does not have the soft and smooth chew characteristics needed in chewing gum base for soft chew applications. Conventional SBR typically also has undesirable odor and taste characteristics that have generally limited its use in chewing gum base formulations. However, there is a desire to use SBR in such applications because it is relatively inexpensive. The present invention also specifically discloses a process for synthesizing styrene-butadiene rubber that is particularly useful in manufacturing chewing gum base for soft chew applications which comprises copolymerizing about 1 phm to about 12 phm styrene and about 88 phm to about 99 phm of 1,3-butadiene in an aqueous emulsion, wherein said copolymerization is conducted at a temperature which is within the range of about 1° C. to about 20° C., and wherein said copolymerization is initiated with an initiator system which is comprised of (a) a free radical generator, (b) a reducing agent selected from the group consisting of ascorbic acid, isoascorbic acid, and ascorbic acid derivatives having the structural formula:

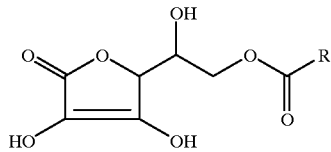

wherein R is an alkyl group containing from 1 to 30 carbon atoms, and (c) a water-soluble metal salt of iron, copper, cobalt, nickel, tin, titanium, vanadium, manganese, chromium or silver.

14 Claims, No Drawings

CHEWING GUM SBR

BACKGROUND OF THE INVENTION

Today ordinary chewing gums and bubble gums generally utilize as their gum base one or a combination of two or more natural or synthetic elastomers. The gum base that is selected provides the chewing gum with its masticatory properties. A chewing gum base is normally admixed with sugars or synthetic sweeteners, perfumes, flavors, plasticizers, and fillers; and then milled and formed into sticks, sheets, or pellets. Cottonseed oil is sometimes also added to give the gum softness. Styrene butadiene rubber (SBR) is a synthetic elastomer that is widely used as a gum base in chewing gums. However, SBR is not widely used in manufacturing soft chew gums because it lacks the desired physical properties. Polyisobutylene is widely used in manufacturing soft chew gums even though it is much more expensive than SBR.

In any case, chewing gum compositions are typically comprised of a water soluble bulk portion, a water insoluble chewing gum base portion and typically water insoluble flavoring agents. The water soluble portion dissipates with a portion of the flavoring agent over a period of time during chewing. The gum base portion is retained in the mouth throughout the chewing process.

The gum base includes a number of ingredients that are subject to deterioration through oxidation during storage. The insoluble gum base generally comprises elastomers, elastomer plasticizers, waxes, fats, oils, softeners, emulsifiers, fillers, texturizers and miscellaneous ingredients, such as antioxidants, preservatives, colorants and whiteners. The compounds contain carbon-carbon double bonds, such as fats, oils, unsaturated elastomers and elastomer plasticizers, are susceptible to oxidation. The gum base constitutes between 5–95% by weight of the chewing gum composition, more typically 10–50% by weight of the chewing gum, and more commonly 15–35% by weight of the chewing gum.

Commonly used natural or artificial antioxidants/preservatives include beta carotenes, acidulants (e.g. Vitamin C), propyl gallate, butylated hydroxyanisole (BHA), and butylated hydroxytoluene (BHT). BHA and BHT are synthetic antioxidants that most commonly used stabilize chewing gum base.

U.S. Pat. No. 4,489,099 discloses the use of Vitamin E in combination with dilauryl thiodipropionate (DLTDP), as a stabilizer for a styrene-butadiene rubber in chewing gum. U.S. Pat. No. 5,132,121, U.S. Pat. No. 5,200,213, and U.S. Pat. No. 5,270,060 disclose a use of 0.01–1.00% by weight of a tocopherol mixture comprising 7–20% by weight alpha tocopherol, 45–75% by weight gamma tocopherol and 18–32% by weight delta tocopherol to stabilize chewing gum base.

SUMMARY OF THE INVENTION

There has been a long felt need in the chewing gum industry for a styrene butadiene rubber (SBR) that has the physical properties needed for utilization in manufacturing chewing gum having soft chew characteristics. This is because it is much less expensive than other elastomers, such as polyisobutylene rubber, that are normally used in such applications. However, conventional SBR does not have the soft and smooth chew characteristics needed in soft chew applications. Furthermore, conventional SBR typically also has undesirable odor and taste characteristics that have generally limited its use in chewing gum base formulations.

The present invention relates to a technique for synthesizing SBR that can be used in manufacturing chewing gum base for soft chew applications. This technique also improves the taste and odor of the SBR which makes it generally more desirable for use in all types of chewing gum. The technique used in this invention to reduce taste and odor involves copolymerizing about 1 phm to about 30 phm styrene and about 70 phm to about 99 phm of 1,3-butadiene in an aqueous emulsion, wherein said copolymerization is conducted at a temperature which is within the range of about 1° C. to about 70° C., and wherein said copolymerization is initiated with an initiator system which is comprised of (a) a free radical generator, (b) a reducing agent selected from the group consisting of ascorbic acid, isoascorbic acid, and ascorbic acid derivatives having the structural formula:

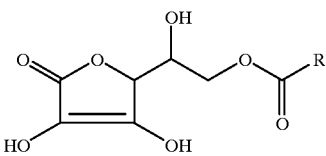

wherein R is an alkyl group containing from 1 to 30 carbon atoms, and (c) a water soluble metal salt of iron, copper, cobalt, nickel, tin, titanium, vanadium, manganese, chromium or silver. It is important for this process to be conducted without utilizing sulfur containing initiator systems.

The present invention also specifically discloses a process for synthesizing styrene-butadiene rubber that is particularly useful in manufacturing chewing gum base for soft chew applications which comprises copolymerizing about 1 phm to about 12 phm styrene and about 88 phm to about 99 phm of 1,3-butadiene in an aqueous emulsion, wherein said copolymerization is conducted at a temperature which is within the range of about 1° C. to about 20° C., and wherein said copolymerization is initiated with an initiator system which is comprised of (a) a free radical generator, (b) a reducing agent selected from the group consisting of ascorbic acid, isoascorbic acid, and ascorbic acid derivatives having the structural formula:

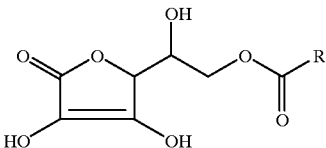

wherein R is an alkyl group containing from 1 to 30 carbon atoms, and (c) a water soluble metal salt of iron, copper, cobalt, nickel, tin, titanium, vanadium, manganese, chromium or silver.

The present invention further discloses a chewing gum base, comprising: (1) about 5 weight percent to about 95 weight percent styrene-butadiene rubber, wherein said styrene-butadiene rubber has a bound styrene content of about 1 weight percent to about 10 weight percent, and wherein said styrene-butadiene rubber has a RPA $t_{80}$ of at least 0.060 minutes; (2) about 0 weight percent to about 75 weight percent of an elastomer plasticizer selected from the group consisting of natural rosin esters and synthetic terpene resins; (3) about 1 weight percent to about 65 weight percent of a filler material; and (4) a gum base stabilizer.

The present invention also reveals a chewing gum which comprises: (1) about 5 weight percent to about 95 weight percent styrene-butadiene rubber, wherein said styrene-butadiene rubber has a bound styrene content of about 1 weight percent to about 10 weight percent, and wherein said styrene-butadiene rubber has a RPA $t_{80}$ of at least 0.060 minutes; (2) about 0 weight percent to about 75 weight percent of an elastomer plasticizer selected from the group consisting of natural rosin esters and synthetic terpene resins; (3) about 1 weight percent to about 65 weight percent of a filler material; and (4) a gum base stabilizer, (5) a sweetener, and (6) a flavor. It is highly desirable for the gum base and the chewing gum to be substantially free of sulfur containing compounds.

DETAILED DESCRIPTION OF THE INVENTION

The SBR of this invention is synthesized by copolymerizing styrene and 1,3-butadiene in an aqueous emulsion. The amount of styrene charged into the aqueous emulsion will typically range from about 1 phm (parts by weight per hundred parts by weight of monomer) to about 35 phm and the amount of 1,3-butadiene charged will be within the range of about 65 phm to about 99 phm. This will result in the SBR having a bound styrene content which is within the range of about 1 weight percent to about 30 weight percent (a bound butadiene content of about 70 weight percent to about 99 weight percent. In some cases, higher ratios of styrene to butadiene are desirable. For instance, SBR for chewing gum base used in bubble gum can have a bound styrene content of as high as about 50 percent. However, in cases where the SBR is being made for soft chew gum base applications the amount of styrene charged will be within the range of about 1 phm to about 13 phm. This will result in the SBR having a bound styrene content that is within the range of about 1 weight percent to about 12 weight percent. It is preferred SBR used in soft chew gum base applications to have a bound styrene content that is within the range of about 2 weight percent to about 8 weight percent. It is typically more preferred SBR used in soft chew gum base applications to have a bound styrene content that is within the range of about 2 weight percent to about 5 weight percent. To attain such lower levels of bound styrene the amount of styrene charged will, of course, be lowered to achieve the desired bound monomer content.

The amount of monomers charged will typically be within the range of about 20 weight percent to about 42 weight percent, based upon the total weight of the aqueous emulsion (monomers, water, soap, and initiator). Lower quantities of monomers can be charged, but the resulting latex will have a low solids content and that is not cost effective. The amount of monomers charged will more typically be within the range of about 30 weight percent to about 40 weight percent, based upon the total weight of the aqueous emulsion. It is generally preferred for the amount of monomers charged to be within the range of about 35 weight percent to about 38 weight percent, based upon the total weight of the aqueous emulsion.

The amount of soap charged into the aqueous emulsion will typically be within the range of about 1 phm to about 10 phm. It is normally preferred for the soap to be used at a level of about 2 phm to about 8 phm. It is typically more preferred for the soap to be used at a level of about 4 phm to about 6 phm.

It is important for the soap to be of food grade. For instance, the soap can be a sodium or a potassium salt of various animal or vegetable fats or waxes. Salts of fatty acids, such as oleic acid, palmitic acid, steric acid, and linoleic acid are preferred. For instance, the soap employed can be the sodium oleate, potassium oleate, sodium palmitate, potassium palmitate, sodium sterate, potassium sterate, sodium linoleate, potassium linoleate, or a mixture of such salts.

Polymerization is initiated by charging an initiator system into the aqueous emulsion polymerization medium. The initiator system is comprised of (a) a free radical generator, (b) a reducing agent selected from the group consisting of ascorbic acid, isoascorbic acid, and ascorbic acid derivatives having the structural formula:

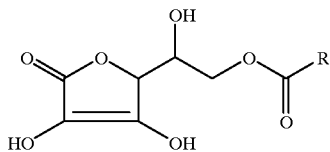

wherein R is an alkyl group containing from 1 to 30 carbon atoms, and (c) a water-soluble metal salt of iron, copper, cobalt, nickel, tin, titanium, vanadium, manganese, chromium or silver.

The free radical generators that are utilized in the redox initiator systems of this invention are well known to persons skilled in the art. Some representative examples of suitable free radical generators include the various peroxygen compounds such as potassium persulfate, ammonium persulfate, benzoyl peroxide, hydrogen peroxide, di-t-buty peroxide, dicumyl peroxide, 2,4-dichlorobenzoyl peroxide, decanoyl peroxide, lauroyl peroxide, cumene hydroperoxide, p-menthane hydroperoxide, α-pinene hydroperoxide, t-butyl hydroperoxide, acetyl acetone peroxide, methyl ethyl ketone peroxide, succinic acid peroxide, dicetyl peroxydicarbonate, t-butyl peroxyacetate, t-buty peroxymaleic acid, t-butyl peroxybenzoate, and the like; and the various alkyl perketals, such as 2,2-bis-(t-butylperoxy)butane, ethyl 3,3-bis(t-butylperoxy)butyrate, 1,1-di-(t-butylperoxy) cyclohexane, and the like.

The reducing agent utilized in the redox initiator systems of this invention can be ascorbic acid or isoascorbic acid of the structural formula:

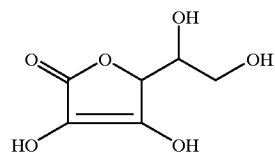

or it can be an ascorbic acid derivative having the structural formula:

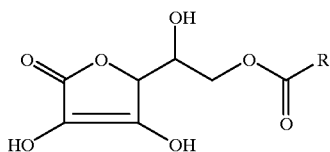

wherein R is an alkyl group containing from 1 to 30 carbon atoms. In most cases R will be an alkyl group containing from 10 to 20 carbon atoms. Ascorbic acid 6-palmitate is an example of such an ascorbic acid derivative that is highly preferred. In fact, the 6-palmitate derivative of ascorbic acid is 2 to 3 times more reactive than ascorbic acid or isoascorbic acid as a reducing agent for lauroyl peroxide.

The water-soluble metal salt of iron, copper, cobalt, nickel, tin, titanium, vanadium, manganese, chromium or silver can be chosen from a wide variety of water soluble compounds. For instance it can be copper (II) amine nitrate, copper (II) metaborate, copper (II) bromate, copper (II) bromide, copper perchlorate, copper (II) dichromate, copper (II) nitrate hexahydrate, iron (II) acetate, iron (III) bromide, iron (III) bromide hexahydrate, iron (II) perchlorate, iron (III) dichromate, iron (III) formate, iron (III) lactate, iron (III) malate, iron (III) nitrate, iron (III) oxalate, iron (II) sulfate pentahydrate, cobalt (II) acetate, cobalt (II) benzoate, cobalt (II) bromide hexahtdrate, cobalt (III) chloride, cobalt (II) fluoride tetrahydride, nickel hypophosphite, nickel octanoate, tin tartrate, titanium oxalate, vanadium tribromide, silver nitrate, and silver fluosilicate. The metal can also be complexed with a compound, such as ethylenediaminetetraacetic acid (EDTA) to make it highly soluble in water. For instance, iron/EDTA complexes or cobalt/EDTA complexes can be used.

The free radical generator will typically be used in an amount that is within the range of about 0.01 phm to about 0.6 phm. The free radical generator will more typically be used in an amount that is within the range of about 0.05 phm to about 0.3 phm. The free radical generator will preferably be used in an amount that is within the range of about 0.1 phm to about 0.2 phm. The free radical generator will more preferably be used at a level that is within the range of about 0.14 phm to about 0.18 phm.

The reducing agent will typically be utilized in the initiator system at a level that is within the range of about 0.01 phm to about 0.3 phm. The reducing agent will more typically be employed at a level that is within the range of about 0.05 phm to about 0.1 phm. The reducing agent will preferably be used at a level that is within the range of about 0.05 phm to about 0.1 phm.

The weight ratio of reducing agent to the free radical generator will normally be within the range of about 0.2:1 to about 0.8:1. The weight ratio of the reducing agent to the free radical generator will preferably be within the range of about 0.3:1 to about 0.7:1. The weight ratio of the reducing agent to the free radical generator will most preferably be within the range of about 0.4:1 to about 0.6:1. It is critical for the weight ratio of the reducing agent to the free radical generator to be less than 1:1 throughout the copolymerization because at levels of 1:1 and higher the reducing agent will shortstop the copolymerization.

The water-soluble metal salt in the initiator system will typically be present in the initiator system at a level that is within the range of about 0.0005 phm to about 0.1 phm. The water-soluble metal salt will more typically be present in the initiator system at a level that is within the range of about 0.001 phm to about 0.01 phm. The water-soluble metal salt will preferably be present in the initiator system at a level that is within the range of about 0.002 phm to about 0.006 phm.

The copolymerization will be conducted at a temperature that is within the range of about 1° C. to about 70° C. Higher polymerization temperatures promote faster polymerization rates and shorter polymerization times. However, lower polymerization temperatures result in the SBR having a lower degree of chain branching which is desirable for soft chew characteristics. Thus, in synthesizing SBR for soft chew applications the polymerization temperature will typically be kept within the range of about 1° C. to about 20° C. In synthesizing SBR for soft chew applications the polymerization temperature will preferably be kept within the range of about 1° C. to about 10° C. In synthesizing SBR for soft chew applications the polymerization temperature will more preferably be kept within the range of about 2° C. to about 5° C.

The copolymerization can be conducted in the presence of n-dodecyl mercaptan as a chain transfer agent to reduce the molecular weight of the SBR. The amount of n-dodecyl mercaptan used will depend upon the molecular weight that is desired for the SBR. Larger quantities of n-dodecyl mercaptan cause greater reductions in the molecular weight of the SBR. In any case, the amount of n-dodecyl mercaptan used should be low enough that it is totally depleted by the time the copolymerization is short-stopped.

The copolymerization will normally be short-stopped at a monomer conversion of about 65 percent to about 70 percent. It is preferred for the reducing agent to be used as the short-stop. The reducing agent, for example isoascorbic acid, will act as a short-stop when it is present at a weight ratio to the free radical generator of at least 1:1. Thus, the copolymerization can be short-stopped by simply adding additional reducing agent to the aqueous emulsion.

After the polymerization has been short-stopped the SBR latex can be coagulated using standard techniques, such as by the addition of salt and acid to the emulsion. The SBR recovered can then be dried using standard procedures, such as air-drying at an elevated temperature. Then, the SBR can then be used in making chewing gum base.

The SBR synthesized using the technique of this invention has outstanding characteristics for use in making chewing gum base because it is of low odor and low taste. This is by virtue of the fact that it is essentially void of sulfur containing compounds. It can also be made to have excellent physical characteristics for use in making gum base for soft chew gum. This is exemplified by the fact that such SBR has a RPA $t_{80}$ of at least 0.060 minutes. RPA $t_{80}$ is the time to 80% of the final torque value as measured on a Rubber Processing Analyzer. For soft chew gum the longer the relaxation time the better. It is accordingly preferred for the SBR to have a RPA $t_{80}$ of at least 0.070 minutes. It is even more preferred for the SBR to have a RPA $t_{80}$ of at least 0.080 minutes.

After being recovered and dried the SBR can be used in making chewing gum base. The chewing gum will incorporate the SBR and, optionally, various other water-insoluble elastomeric components that contribute to the elasticity of the chewing gum and the longevity of the chew. This elastomeric component generally constitute about 5 to about 95 weight percent of the gum base, more preferably about 10 to about 70 weight percent of the gum base and most preferably about 15 to about 45 weight percent of the gum base. The elastomers in addition to the SBR can include synthetic elastomers such as polyisobutylene, isobutylene-isoprene copolymer, polyvinyl acetate, vinyl acetate-vinyl laurate copolymer, and combinations thereof. The elastomers in addition to the SBR may also include natural elastomers such as liquid latex, guayule, jelutong, lechi caspi, perillo, massaranduba balata, massaranduba chocolate, nispero, rosindinha, chicle, gutta hang kang and combinations thereof. In addition to the elastomers described above, the gum base will typically include elastomer plasticizers, waxes, softeners/emulsifiers, fillers/texturizers, colorants, a stabilizer, and whiteners. Elastomer plasticizers constitute from about 0 to about 75 percent by weight of the gum base, preferably 5 to 45 percent by weight and most preferably 10 to 30 percent by weight. Elastomer plasticizers include natural rosin esters such as glycerol ester of partially hydrogenated rosin, glycerol ester of polymerized rosin, glycerol ester of partially dimerized rosin, glycerol ester of rosin, pentaerythritol esters of partially hydrogenated rosin, methyl and partially hydrogenated methyl esters of rosin, pentaerythritol ester of rosin or mixtures thereof. Elastomer plasticizers also include synthetics materials, such as terpene resins derived from alphapinene, beta-pinene and/or d-limonene.

The stabilizer included in the gum base can be BHT or any other conventional stabilizer. It can also be a combination of Vitamin E and dilauryl thiodipropionate as described in U.S. Pat. No. 4,489,099. The stabilizer can also be a tocopherol mixture as described in U.S. Pat. No. 5,270,060 which comprises 7–20% by weight alpha tocopherol, 45–75% by weight gamma tocopherol and 18–32% by weight delta tocopherol. A commercially available tocopherol blend that can be used is COVI-OX T-50, available from the Henkel Corporation of Cincinnati, Ohio. COVI-OX T-50 contains about 12.5% alpha tocopherol, about 63.9% gamma tocopherol, and about 23.6% delta tocopherol, based on total tocopherol weight, in a soybean oil diluent (70% tocopherol in 30% soybean oil). The teachings of U.S. Pat. No. 4,489,099 and U.S. Pat. No. 5,270,060 are incorporated herein by reference in their entirety.

Waxes include synthetic (e.g. polyethylene and Fischer-Tropsch waxes) and natural (candelilla carnauba, beeswax, rice bran or mixtures thereof) and petroleum (e.g. microcrystalline and paraffin). Waxes, when used, generally constitute up to 30 weight percent of the gum base.

Softeners/emulsifiers include tallow, hydrogenated tallow, hydrogenated and partially hydrogenated vegetable oils, cocoa butter, glycerol monostearate, glycerol triacetate, lecithin, mono-, diglycerides and triglycerides, acetylated glycerides and fatty acids (e.g. stearic, palmitic, oleic, linoleic and linolenic acids) or mixtures thereof Softeners/emulsifiers generally constitute between 0.5 and 40 weight percent of the gum base.

Fillers/texturizers include magnesium and calcium carbonate, ground limestone and silicate types such as magnesium and aluminum silicate, clay, alumina, talc as well as titanium oxide, monocalcium phosphite, dicalcium phosphite and tricalcium phosphate, cellulose polymers such as ethyl, methyl and wood or mixtures thereof. Preferably, the filler comprises about 1 to about 65 percent by weight of the gum base Colorants and whiteners include FD&C-type dyes and lakes, fruit and vegetable extracts, titanium dioxide or mixtures thereof.

The gum base is typically prepared by adding an amount of the elastomer, elastomer plasticizers and filler to a heated sigma blade mixer with a front to rear blade speed ratio of typically 2:1. The initial amounts of ingredients are determined by the working capacity of the mixing kettle in order to attain a proper consistency. After the initial ingredients have massed homogeneously, the balance of the elastomer plasticizer, filler, softeners, etc. are added in a sequential manner until a completely homogeneous molten mass is attained. This can usually be achieved in about one to about four hours, depending on the formulation. The final mass temperature can be between 60° C. and 150° C., more preferably between 80° C. and 120° C. The completed molten mass is emptied from the mixing kettle into coated or lined pans, extruded or cast into any desirable shape and allowed to cool and solidify.

The water-soluble portion of the chewing gum may comprise softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum.

Bulk sweeteners constitute between 20–80% by weight of the chewing gum and may include both sugar and sugarless sweeteners and components. Sugar sweeteners may include saccharide-containing components including but not limited to sucrose, maltose, dextrin, dried invert sugar, levulose, galactose, corn syrup solids, and the like, alone or in combination. The sugar can also be a monosaccharides of 5 or 6 carbon atoms, such as arabinose, xylose, ribose, glucose, mannose, galactose, fructose, dextrose, or sorbose or mixtures of two or more of the foregoing monosaccharides, disaccharides, for example, sucrose such as cane or beet sugar, lactose, maltose or cellobiose; polysaccharides, such as partially hydrolyzed starch or dextrin.

Sugarless sweeteners include components with sweetening characteristics but are devoid of the commonly known sugars. Sugarless sweeteners include, but are not limited to, sugar alcohols such as sorbitol, mannitol, xylitol, hydrogenated starch hydrolysates, maltitol, and the like, alone or in combination. Some additional examples of artificial sweeteners which may be employed include sodium, calcium or ammonium saccharin salts, free saccharin and, dihydrochalcones, dipotassium glycyrrhizin, glycyrrhizic acid ammonium salt, L-aspartyl-L-phenylalanine methyl ester (aspartame), the sodium or potassium salt of 3,4-dihydro-6-methyl-1,2,3-oxathiazine-4-one-2,2-dioxide (Ace-sulfame-K), as well as *Stevia rebaudiana* (Stevioside), *Richardella dulcifica* (Miracle Berry), *Diascoreophyllum cumminsii* (Serendipity Berry), cyclamate salts, and the like, or mixtures of any two or more of the above.

High intensity sweeteners can also be present. Such high intensity sweeteners may include but are not limited to sucralose, aspartame, salts of acesulfame, alitame, saccharin and its salts, cyclamic acid and its salts, dihydrochalcones, thaumatin, monellin, and the like, alone or in combination.

Combinations of sugar and/or sugarless sweeteners may be used in the chewing gum. The sweetener may also function in the chewing gum in whole or in part as a water soluble bulking agent. Additionally, the softener may also provide additional sweetness, such as with aqueous sugar or alditol solutions.

One or more flavoring agents may be present in the chewing gum in an amount within the range of about 0.1 to about 10.0 percent and preferably from about 0.5 to about 5.0 weight percent of the gum. The flavoring agents may comprise essential oils, natural or synthetic flavors or mixtures thereof including but not limited to oils derived from plants and fruits such as citrus oils, fruit essences, peppermint oil, spearmint oil, other mint oils, clove oil, oil of wintergreen, anise, and the like. Artificial flavoring agents and components are also contemplated. Those skilled in the art will recognize that natural and artificial flavoring agents may be combined in various acceptable fashions. Optional ingredients such as colors, emulsifiers and pharmaceutical agents may also be added to the chewing gum.

In general, chewing GUM is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks, or casting into pellets.

Generally, the ingredients are mixed by first softening (e.g. with heat) the gum base and adding it to the running mixer. The gum base can also be softened in the mixer itself. Color or emulsifiers may also be added at this time. A softener, such as glycerin, may also be added at this time along with syrup and a portion of the bulking agent. Further portions of the bulking agent portion may then be added to the mixer. A flavoring agent is typically added with the final portion of the bulking agent.

The entire mixing procedure typically takes from five to fifteen minutes, but longer mixing times may sometimes be required. Those skilled in the art will recognize that variations of the above described procedure, or different procedures, may be followed.

This invention is illustrated by the following example that are merely for the purpose of illustration and are not to be regarded as limiting the scope of the invention or the manner in which it can be practiced. Unless specifically indicated otherwise, parts and percentages are given by weight.

EXAMPLE

In this experiment SBR was synthesized by utilizing the technique of this invention. In the procedure used the copolymerization of styrene and butadiene was initiated by charging 16,700 grams of water, 40 grams of tripotassium phosphate, 1,145 grams of sodium oleate (as a 10% aqueous solution), 40 grams of an iron/EDTA complex, 9 grams of isoascorbic acid (erythorbic acid), 70 grams of styrene, 1.5 grams of n-dodecylmercaptan, 930 grams of 1,3-butadiene, and 42.5 grams of α-pinene hydroperoxide (44% active) into a polymerization reactor having a capacity of 10 gallons. The aqueous polymerization medium in the reactor was maintained at a temperature of 41° F. After 65–70 minutes of polymerization time an additional 2,500 grams of 10% aqueous sodium oleate soap solution was charged into the reactor. Then, after waiting an additional 10 minutes an additional 630 grams of styrene, an additional 8,370 grams of 1,3-butadiene, and an additional 13.5 grams of n-dodecylmercaptan were charged into the reactor. After the solids content reached 16–17% (after about 8 hours of total polymerization time) a final shot of sodium oleate (10% aqueous solution) was charged into the reactor. Then after a solids content of 24–25% was reached the copolymerization was short-stopped by charging 500 grams of a 10% solution of isoascorbic acid (pH of 10–11) into the reactor.

The SBR was recovered from the latex and dried. It was determined to have a bound styrene content of 5%, a Mooney viscosity of 80, and a RPA $t_{80}$ of 0.082 minutes. The long relaxation time observed is indicative of good physical properties for use in gum base formulations for soft chew gums. It was also noted that the SBR sample had very low odor and low taste characteristics. Thus, the SBR made had excellent characteristics for utilization in making gum base for soft chew gum.

While certain representative embodiments and details have been shown for the purpose of illustrating the subject invention, it will be apparent to those skilled in this art that various changes and modifications can be made therein without departing from the scope of the subject invention.

What is claimed is:

1. A chewing gum base, comprising: (1) about 5 weight percent to about 95 weight percent styrene-butadiene rubber, wherein said styrene-butadiene rubber has a bound styrene content of about 1 weight percent to about 10 weight percent, and wherein said styrene-butadiene rubber has a RPA $t_{80}$ of at least 0.060 minutes; (2) about 0 weight percent to about 75 weight percent of an elastomer plasticizer selected from the group consisting of natural rosin esters and synthetic terpene resins; (3) about 1 weight percent to about 65 weight percent of a filler material; and (4) a gum base stabilizer.

2. A gum base as specified in claim 1 wherein said gum base is substantially free of sulfur containing compounds.

3. A gum base as specified in claim 2 wherein said gum base contains from about 10 weight percent to about 70 weight percent of the styrene-butadiene rubber.

4. A gum base as specified in claim 3 wherein said gum base contains from about 5 to about 45 weight percent of the elastomer plasticizer.

5. A gum base as specified in claim 3 wherein said gum base contains from about 10 to about 30 weight percent of the elastomer plasticizer.

6. A gum base as specified in claim 5 wherein the elastomer plasticizer is a natural rosin ester.

7. A gum base as specified in claim 5 wherein the elastomer plasticizer is a synthetic terpene resin.

8. A gum base as specified in claim 7 wherein said gum base is further comprised of up to 30 weight percent of a wax selected from the group consisting of natural waxes, synthetic waxes, petroleum waxes, and mixtures thereof.

9. A gum base as specified in claim 8 further comprising between 0.5 and 40 weight percent of a softener selected from the group consisting of tallow, hydrogenated tallow, hydrogenated and partially hydrogenated vegetable oils, cocoa butter, glycerol monostearate, glycerol triacetate, lecithin, monoglycerides, diglycerides, triglycerides, fatty acids, and mixtures thereof.

10. A gum base as specified in claim 9 wherein the filler material comprises one or more materials selected from the group consisting of magnesium carbonate, calcium carbonate, ground limestone, magnesium silicate, aluminum silicate, clay, alumina, talc, titanium oxide, monocalcium phosphate, dicalcium phosphate, tricalcium phosphate, cellulose polymers, wood and mixtures thereof.

11. A gum base as specified in claim 10 wherein the gum base stabilizer is a tocopherol mixture that comprises 12–15% by weight alpha tocopherol, 63–65% by weight gamma tocopherol and 23–26% by weight delta tocopherol.

12. A gum base as specified in claim 2 wherein said gum base contains from about 15 weight percent to about 45 weight percent of the styrene-butadiene rubber.

13. A chewing gum which comprises: (1) about 5 weight percent to about 95 weight percent styrene-butadiene rubber, wherein said styrene-butadiene rubber has a bound styrene content of about 1 weight percent to about 10 weight percent, and wherein said styrene-butadiene rubber has a RPA of at least 0.060 minutes; (2) about 0 weight percent to about 75 weight percent of an elastomer plasticizer selected from the group consisting of natural rosin esters and synthetic terpene resins; (3) about 1 weight percent to about 65 weight percent of a filler material; and (4) a gum base stabilizer, (5) a sweetener, and (6) a flavor.

14. A chewing gum as specified in claim 13 wherein said chewing gum is substantially free of sulfur containing compounds.

* * * * *